(12) United States Patent
Söllner et al.

(10) Patent No.: US 10,436,926 B2
(45) Date of Patent: Oct. 8, 2019

(54) MARINE VIBRATOR SOURCE ACCELERATION AND PRESSURE

(71) Applicant: PGS Geophysical AS, Oslo (NO)

(72) Inventors: Walter F. Söllner, Oslo (NO); Okwudili Orji, Oslo (NO)

(73) Assignee: PGS Geophysical AS, Oslo (NO)

( * ) Notice: Subject to any disclaimer, the term of this patent is extended or adjusted under 35 U.S.C. 154(b) by 40 days.

(21) Appl. No.: 15/619,719

(22) Filed: Jun. 12, 2017

(65) Prior Publication Data
US 2018/0052245 A1    Feb. 22, 2018

Related U.S. Application Data

(60) Provisional application No. 62/376,268, filed on Aug. 17, 2016.

(51) Int. Cl.
| | | |
|---|---|---|
| G01V 1/36 | (2006.01) | |
| G01V 1/38 | (2006.01) | |
| G01V 3/08 | (2006.01) | |
| G01V 1/00 | (2006.01) | |

(52) U.S. Cl.
CPC .............. *G01V 1/368* (2013.01); *G01V 1/005* (2013.01); *G01V 1/38* (2013.01); *G01V 1/3808* (2013.01); *G01V 3/083* (2013.01); *G01V 2003/086* (2013.01); *G01V 2210/42* (2013.01); *G01V 2210/62* (2013.01)

(58) Field of Classification Search
CPC ...... G01V 1/368; G01V 1/3808; G01V 3/083; G01V 1/38; G01V 2210/62; G01V 2003/086; G01V 2210/42; G01V 1/005

USPC .......................................................... 367/23
See application file for complete search history.

(56) References Cited

U.S. PATENT DOCUMENTS

| | | | | |
|---|---|---|---|---|
| 6,418,079 | B1 | 7/2002 | Fleure | |
| 7,881,160 | B2 | 2/2011 | Rouquette | |
| 8,295,124 | B2* | 10/2012 | Abma | G01V 1/362 367/38 |
| 9,389,327 | B2 | 7/2016 | Kroling | |
| 9,746,569 | B2* | 8/2017 | Sallas | G01V 1/3861 |
| 9,778,385 | B2* | 10/2017 | Castor | G01V 1/005 |

(Continued)

FOREIGN PATENT DOCUMENTS

WO    2015104210    7/2015

OTHER PUBLICATIONS

Shaw, "Magnitude dependence of radiated energy spectra: Far-field expressions of slip pulses in earthquake models"; Journal of Geophysical Research, vol. 108, No. B2, (Feb. 18, 2003) (15 pgs) http://www.ldeo.columbia.edu/~shaw/publications/Shaw03.pdf.

(Continued)

*Primary Examiner* — Daniel L Murphy

(57) ABSTRACT

Marine survey data resulting from a first signal comprising a signal representing a flat spectral far-field pressure generated by a marine vibrator source swept over a frequency range according to a time function of motion such that acceleration of the marine vibrator source is a flat function in a frequency domain can be used to improve full waveform inversion. For example, full waveform inversion can be performed using the marine survey data received from the first signal and from a second signal generated by an impulsive seismic source to estimate a physical property of a subsurface location.

19 Claims, 12 Drawing Sheets

(56) References Cited

U.S. PATENT DOCUMENTS

| | | |
|---|---|---|
| 2006/0018192 A1 | 1/2006 | Jeffryes et al. |
| 2011/0149683 A1 | 6/2011 | Lunde et al. |
| 2013/0100766 A1 | 4/2013 | Ruet et al. |
| 2013/0100778 A1 | 4/2013 | Ruet et al. |
| 2013/0343153 A1 | 12/2013 | Laws |
| 2014/0204701 A1 | 7/2014 | Teyssandier |
| 2015/0085605 A1 | 3/2015 | Tenghamn |
| 2015/0120200 A1 | 4/2015 | Brenders et al. |
| 2016/0187507 A1 | 6/2016 | Brenders et al. |
| 2016/0202378 A1 | 7/2016 | Ridsdill-Smith et al. |
| 2016/0327668 A1* | 11/2016 | Pires De Vasconcelos ............ G01S 15/8977 |

OTHER PUBLICATIONS

Seol, "Time domain method for the prediction of pressure fluctuation induced by propeller sheet cavitation: Numerical simulations and experimental validation"; Ocean Engineering, vol. 72 (Aug. 3, 2013) (10 pgs) http://www.sciencedirect.com/science/article/pii/S002980181300276X/pdfft?md5=d72483d26dec98341cf927ddefb418ef&pid=1-s2.0-S002980181300276X-main.pdf.

GeoSpectrum Technologies Inc.,Customizing Detection, "Modular Projector System"; (Accessed: Sep. 2, 2016) (2 pgs) http://geospectrum.ca/sources/modular-projector-system/.

Search Report for related GB Application No. 1713200.2, dated Feb. 8, 2018 (4 pgs).

Rietsch, "Vibroseis Signals with Prescribed Power Spectrum"; Geophysical Prospecting, vol. 25, pp. 613-620 (8 pg) (Published 1977).

Rietsch, "Computerized Analysis of Vibroseis Signal Similarity"; Geophysical Prospecting, vol. 25, pp. 541-552 (12 pgs) (Published 1977).

* cited by examiner

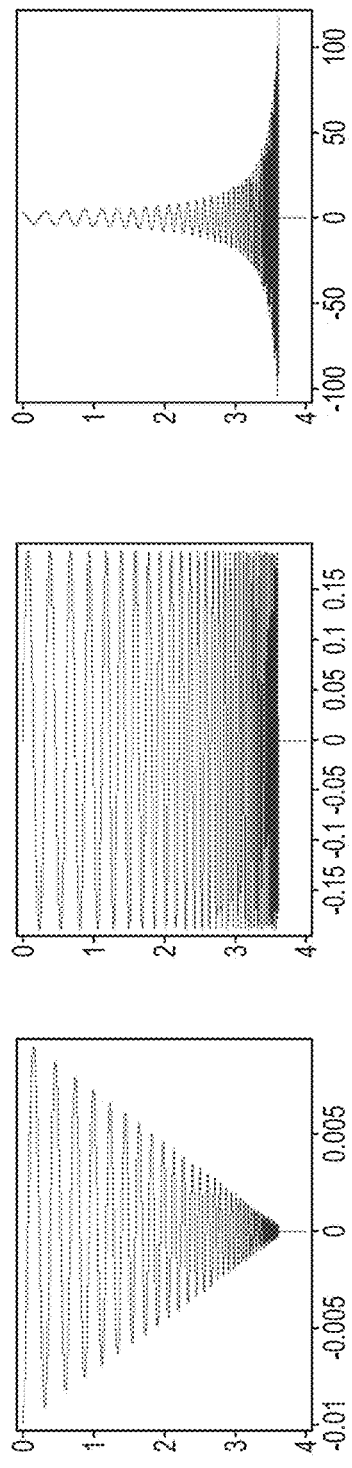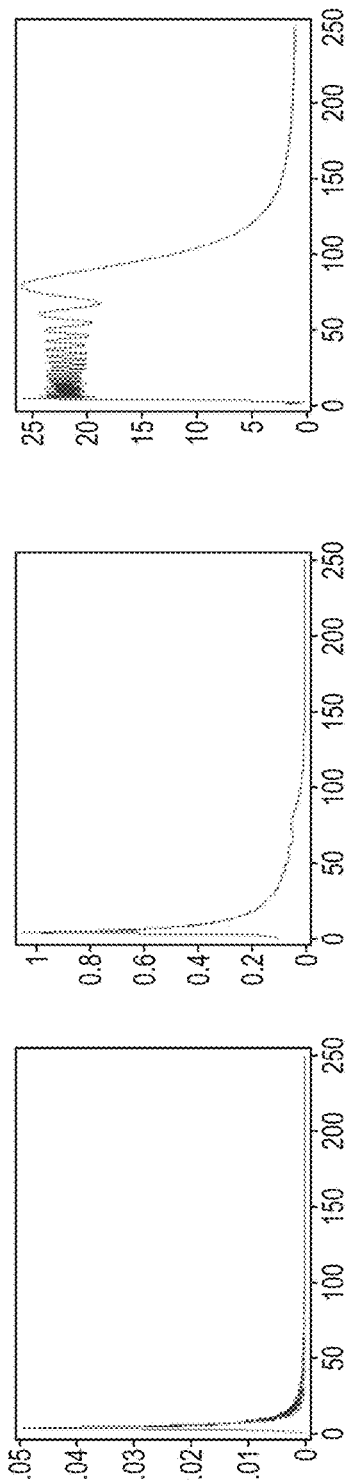

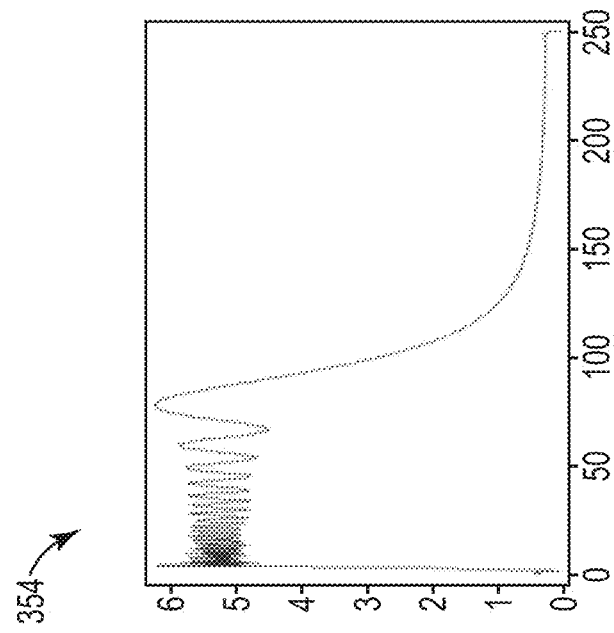
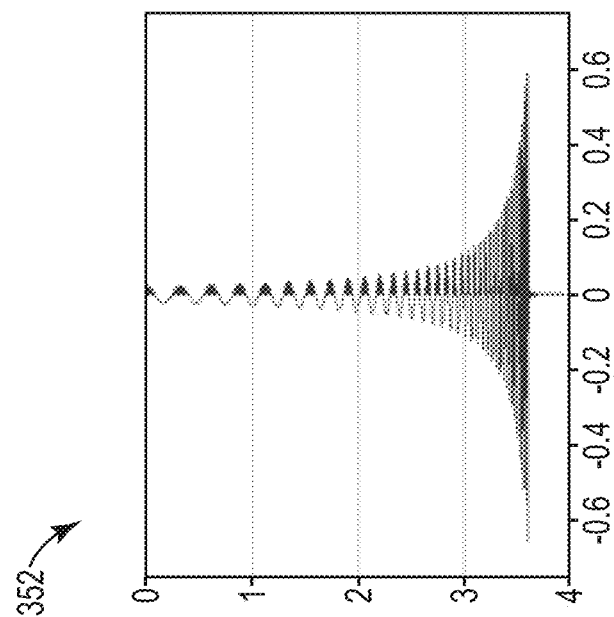

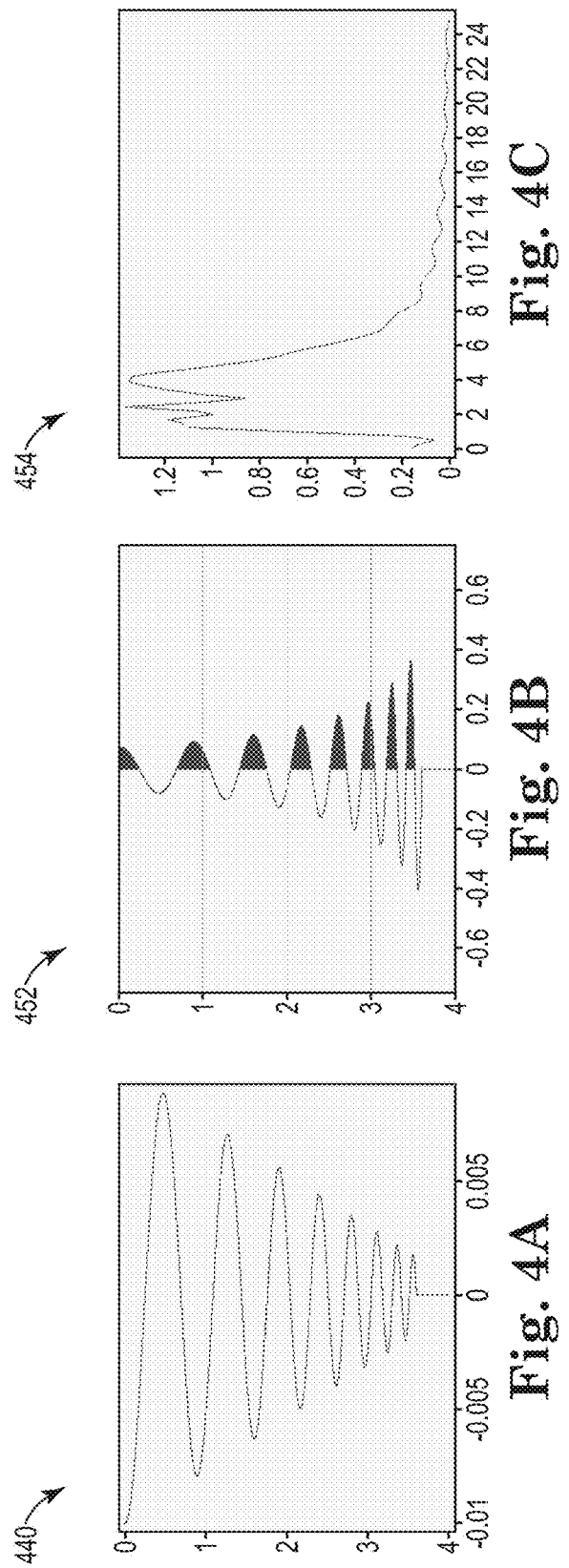

MARINE VIBRATOR SOURCE ACCELERATION AND PRESSURE

CROSS-REFERENCE TO RELATED APPLICATIONS

This application claims priority to U.S. Provisional Application 62/376,268, filed Aug. 17, 2016, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources below the sea surface and over a subterranean formation to be surveyed for mineral deposits. Marine survey receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more marine survey sources, which can be impulsive seismic sources such as air guns, non-impulsive sources such as marine vibrator sources, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The marine survey receivers thereby measure a wavefield that was initiated by the actuation of the marine survey source.

BRIEF DESCRIPTION OF THE DRAWINGS

FIGS. 3A-3H illustrate various signals and amplitude spectra for plate motion, velocity, acceleration, and pressure associated with a marine vibrator source.

FIGS. 4A-4C illustrate various signals and amplitude spectra for plate motion and pressure associated with a marine vibrator source.

DETAILED DESCRIPTION

Figure 1:
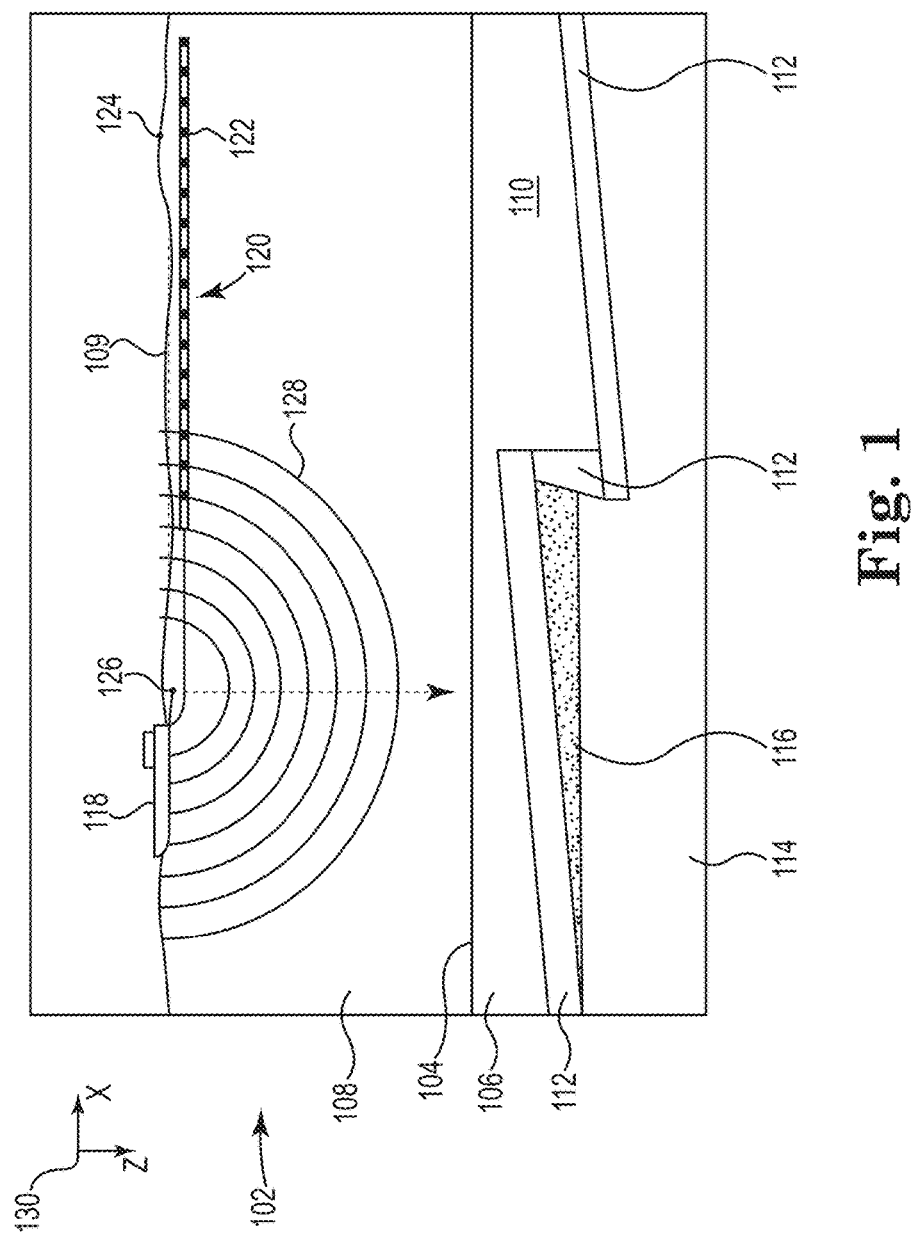
FIG. 1 illustrates an elevation or xz-plane view of marine surveying in which signals are emitted by a marine survey source for recording by marine survey receivers.

The present disclosure is related to marine vibrator source acceleration and pressure. A marine vibrator source is a type of non-impulsive source that can include at least one moving plate. The marine vibrator source can be controlled with a time signal that controls motion of the at least one plate of the marine vibrator source. For example, where the motion of the plate can be described as a sweep (where the frequency increases or decreases with time), the time signal can be referred to as a sweep signal. At least one embodiment of the present disclosure can include using Fourier transform properties of sweep signals to illustrate how amplitude spectra of emitted marine vibrator source wavefields can be modified by changing a sweep rate. According to at least one embodiment, the modification can be exploited to increase the amplitude spectra of emitted marine vibrator source wavefields to reach a desired level for exploration, by keeping time amplitudes constant. In at least one embodiment, this can be used to generate low frequencies from a marine vibrator source, such as bender source; with a desired signal to noise ratio where other sources, such as air guns, may fail. As used herein, a "low frequency" includes frequencies between approximately 1 Hertz and 6 Hertz. A bender source is a flexural disc projector. A bender source may employ one or more piezoelectric elements, such that the mechanical vibration of the bender source is driven by piezoelectric distortion based on electrical energy applied to the piezoelectric element. The marine vibrator source may be swept over a range of frequencies. This technique may result in energy spread out with the sweep and less environmental impact than using an impulsive seismic type of source such as air guns or dynamite.

At least one embodiment of the present disclosure can include designing a marine vibrator source survey for broadband imaging and/or adding low frequencies to initialize a full waveform inversion (FWI). FWI is a non-linear data-fitting procedure that aims at obtaining detailed estimates of subsurface properties from marine survey data. In FWI, given an initial guess of subsurface parameters, a model is predicted by solving a wave equation, which is then updated in order to reduce the misfit between the observed and predicted data; this is repeated iteratively until the data misfit is sufficiently small. FWI can be used to build high resolution velocity models. A velocity model is a map of the subsurface indicating velocities of waves at various locations in the subsurface. The present disclosure provides several advantages including the use of environmentally-friendly broadband sources, low frequencies added to acquisitions using sources such as air guns, and improved FWI by relaxing cycle skipping, as described in more detail herein.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 232 may reference element "32" in FIG. 2, and a similar element may be referenced as 732 in FIG. 7. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine surveying in which signals are emitted by a marine survey source 126 for recording by marine survey receivers 122. The recording can be used for processing and analysis in order to help characterize the structures and distributions of features and materials underlying the surface of the earth. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which marine survey receivers may be coupled. In one type of marine survey, each marine survey receiver, such as the marine survey receiver 122 represented by the shaded disk in FIG. 1, comprises a pair of sensors including a geophone that detects particle displacement within the water by detecting particle motion variation, such as velocities or accelerations, and/or a hydrophone that detects variations in pressure. In one type of marine survey, each marine survey receiver, such as marine survey receiver 122, comprises an electromagnetic receiver that detects electromagnetic energy within the water. The streamers 120 and the marine survey vessel 118 can include sensing electronics and data-processing facilities that allow marine survey receiver readings to be correlated with absolute positions on the sea surface and absolute three-dimensional positions with respect to a three-dimensional coordinate system. In FIG. 1, the marine survey receivers along the streamers are shown to lie below the sea surface 109, with the marine survey receiver positions correlated with overlying surface positions, such as a surface position 124 correlated with the position of marine survey receiver 122. The marine survey vessel 118 can also tow one or more marine survey sources 126 that produce signals as the marine survey vessel 118 and streamers 120 move across the sea surface 109. Marine survey sources 126 and/or streamers 120 may also be towed by other vessels, or may be otherwise disposed in fluid volume 108. For example, marine survey receivers may be located on ocean bottom cables or nodes fixed at or near the surface 104, and marine survey sources 126 may also be disposed in a nearly-fixed or fixed configuration. For the sake of efficiency, illustrations and descriptions herein show marine survey receivers located on streamers, but it should be understood that references to marine survey receivers located on a "streamer" or "cable" should be read to refer equally to marine survey receivers located on a towed streamer, an ocean bottom receiver cable, and/or an array of nodes.

FIG. 1 shows source energy illustrated as an expanding, spherical signal, illustrated as semicircles of increasing radius centered at the marine survey source 126, representing a down-going wavefield 128, following a signal emitted by the marine survey source 126. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

At least one embodiment of the present disclosure can include more than one down-going wavefield 128. For example, two such down-going wavefields can include a first signal comprising a signal representing a flat spectral far-field pressure generated by a marine vibrator source swept over a frequency range according to a time function of motion such that acceleration of the marine vibrator source is a flat function in a frequency domain and a second signal generated by an impulsive seismic source.

At least one embodiment of the present disclosure can include a down-going wavefield 128 generated by a marine survey source 126, comprising a marine vibrator source, with a sweep length of the marine survey source 126 defined over a broadband frequency range based on ambient noise and target depth such that a sweep amplitude spectrum for a target reflection is above the ambient noise and where the broadband frequency range includes frequencies sufficient for full waveform inversion. Ambient noise is a signal other than the signal intended to be sensed and recorded and may also be referred to as background noise.

At least one embodiment of the present disclosure can include a down-going wavefield 128 generated by a marine vibrator source having a control signal applied thereto, where the control signal is defined by a time function of motion to control movement of a marine vibrator source and where the time function is such that acceleration of the marine vibrator source is a flat function in a frequency domain to generate a flat spectral far-field pressure.

The term "flat" is used herein with reference to various flat spectra or functions, such as a flat spectral far-field pressure. The flat spectra are oscillating, however the oscillation is known as the Gibbs phenomenon. The Gibbs phenomenon is the peculiar manner in which the Fourier series of a piecewise continuously differentiable periodic function behaves at a jump discontinuity. With respect to the present disclosure, the Fourier transform of a window function can be convolved with the signal spectra. A window function is a mathematical function used in signal processing that is zero-valued outside of some chosen interval. When another function, waveform, or data sequence is multiplied by a window function, the product is also zero-valued outside the interval. The remaining, overlapping portion is referred to as the window. An example of a suitable window function is a boxcar window function. A boxcar function is equal to zero except for an interval where it is equal to a constant. At least one of the sweep signals described herein can be based on a boxcar window function. The signal spectrum can be convolved with the spectrum of the window function (e.g., boxcar function) in the frequency domain. Signal samples in the frequency domain can be seen as being represented by a sinc (sine cardinal) function (the Fourier transform of the window function). A smoother window function than a boxcar window function, such as a window function with smoothly dipping flanks, would have less oscillations. However, the flanks would introduce additional frequencies, which would complicate the definition of the start and end frequency of the signal.

Figure 2:
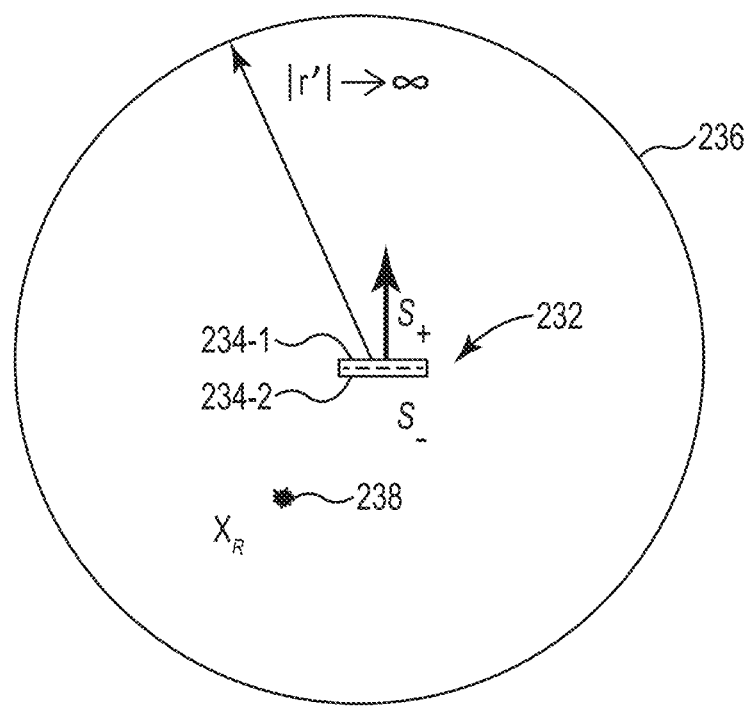
FIG. 2 illustrates an elevation or plane view of a state representing a marine vibrator source surrounded by a homogeneous body.

FIG. 2 illustrates an elevation or plane view of a state representing a marine vibrator source 232 surrounded by a homogeneous body. For example, the marine vibrator source 232 can be a bender source. The marine vibrator source 232 can include an oscillating pair of plates 234-1, 234-2 in water enclosing a volume of air under pressure. The wavefield outside this volume can be derived from the motion of the plates 234-1, 234-2 of the marine vibrator source 232, which can lead to increasing and decreasing of the enclosed volume. For instance, FIG. 2 illustrates a single marine vibrator source 232 with a plate surface with a normal vector across the inner surface. Inside the plates 234-1, 234-2, acoustic laws may fail, and this volume can be removed from the model.

Based on an acoustic representation theorem, the pressure wavefield inside the model can be enclosed by a spherical surface 236 as an outer border and an idealized surface surrounding the oscillating plates 234-1, 234-2 as an inner border. This can be expressed for a model free of body forces by surface integrals of the free space Green's function g, the pressure p, and the gradients of these wavefields on the outer and inner surfaces. By letting the outer surface go to infinity ("|r'|→∞") and applying Sommerfeld's radiation condition, the pressure can be written as a surface integral enclosing the plate volume:

$$p(x_R,t) = \int_{S_++S_-} (g(x,x_R,t)*\nabla p(x,t) - \nabla g(x,x_R,t)*p(x,t)) \cdot n dS \quad (1)$$

where $x_R$ is a point 238 where the pressure wavefield is calculated, x is a position vector, n is a normal vector (indicated by the arrow) and t is time.

In equation (1), it can be assumed that the surface surrounding the total removed volume is given by the plate surfaces $S_+$ and $S_-$. For instance, the distance between the plates is smaller than the plate size. Choosing for the direction of the normal vector to point from $S_-$ to $S_+$ (as indicated in FIG. 2), the integral over the entire surface may be expressed as:

$$p(x_R,t) = \int_{S_+} (g(x,x_R,t)*\nabla p(x,t) - \nabla g(x,x_R,t)*p(x,t)) \cdot n dS - \int_{S_-} (g(x,x_R,t)*\nabla p(x,t) - \nabla g(x,x_R,t)*p(x,t)) \cdot n dS \quad (2)$$

With respect to equations (1) and (2), no assumptions are made about Green's functions or wavefields on the plate surfaces.

If continuity on the pressure fields across the surfaces is assumed, and continuity is imposed for the Green's functions and its derivatives across the surfaces, the expression for the pressure reduces to:

$$p(x_R,t) = \int_{S_+} (x,x_R,t)*[\nabla p(x,t)] \cdot n dS \quad (3)$$

The bracket [.] in equation (3) denotes the saltus of values, in this case of the gradients of the pressure wavefield, across the plate surfaces. As will be appreciated, a saltus is a jump (break in continuity) or oscillation. Because the plates 234-1, 234-2 are close together relative to the volume 236, the equations can be reduced to consider only one plate ($S_+$) as an idealized case. To improve accuracy, the pressure gradients can be replaced by particle accelerations (a) and density (ρ) of the fluid, from an equation of motion:

$$p(x_R,t) = \rho \int_{S_+} (x,x_R,t)*[a(x,t)] \cdot n dS \quad (4)$$

Equation 4 is an expression for calculating an emitted pressure wavefield from a surface integral of the free space Green's function and the particle acceleration saltus across the surfaces of one pair of synchronously oscillating plates 234-1, 234-2. For example, the surface integral of the acceleration differences across the plates 234-1, 234-2 can be convolved with the Green's function. Convolution is a mathematical operation on two functions that produces a third function, which can be viewed as a modified version of one of the original functions, giving the integral that expresses the amount of overlap of the original functions. By using the continuity of the normal particle velocity at the plate water contact, the particle acceleration can be obtained from the induced plate oscillation. As a consequence of equation (4), the derived pressure wavefield everywhere in the model from an elementary marine vibrator can follow in signature the acceleration of the plate oscillation. For example, the time function of the plate motion can be designed such that the acceleration becomes a flat function in the frequency domain, in an example where a flat spectral far-field pressure emitted by the source is the goal. Ignoring this fact and generating a plate motion of a flat spectral behavior may lead to an emitted pressure wavefield with suppressed low frequencies.

FIGS. 3A-3H illustrate various signals and amplitude spectra for plate motion, velocity, acceleration, and pressure associated with a marine vibrator source. An oscillating time function can be mathematically described by a time signal, referred to as a sweep signal "s(t)", which is sinusoidal and has frequencies that increase or decrease monotonically (meaning that the frequencies either only increase or only decrease) within a given frequency range:

$$s(t) = e(t)\sin[2\pi\theta(t) + \theta(0)] \quad (5)$$

In equation (5), the time dependent factor e(t) represents the envelope, θ(t) is a function that represents the instantaneous phase, and θ(0) represents the initial phase of the sweep. The first derivative of the phase function, θ'(t), is equal to the instantaneous angular frequency of the sweep. The second derivative of the phase function, θ''(t), is equal to the sweep rate. If the instantaneous angular frequency is a linear function of time, the sweep is called linear sweep, which can be further differentiated in upsweep and downsweep, depending on whether the frequencies are increasing or decreasing with time.

The sweep amplitude spectrum "|S(ω)|" is related to the sweep rate. An amplitude spectrum is the amplitude distribution as a function of frequency. Based on Fourier theorem, an expression relating the amplitude spectra of sweeps to the envelope and sweep rate in time is:

$$|S(\omega)| = \frac{1}{2}e(t)[\theta''(t)]^{-1/2} \quad (6)$$

For a constant sweep rate, the spectral variations can follow the time envelope according to equation (6).

The combination of equations (4) and (6) can suggest that in order to generate a far-field pressure with flat amplitude spectra, the amplitude spectra of the marine vibrator source plate motion can be, according to equation (4), proportional to $1/f^2$, which is twice time integrated, and for a given sweep envelope, the sweep rate can then be defined using equation (6). The plate motion can be described by:

$$u(t) = \frac{\frac{-\omega_2 T + (\omega_2 - \omega_1)t}{\omega_1 \omega_2 T}\left(\cos\left(\theta(0) + \frac{\omega_1 \omega_2 T}{(\omega_1 - \omega_2)}\ln\left[1 + \frac{(\omega_1 - \omega_2)t}{\omega_2 T}\right]\right) + \frac{(\omega_2 - \omega_1)}{\omega_1 \omega_2 T}\sin\left(\theta(0) + \frac{\omega_1 \omega_2 T}{(\omega_1 - \omega_2)}\ln\left[1 + \frac{(\omega_1 - \omega_2)t}{\omega_2 T}\right]\right)\right)}{1 + \left(\frac{(\omega_2 - \omega_1)t}{\omega_2 T}\right)^2} \quad (7)$$

In equation 7, $\omega_1$ is the instantaneous circular frequency ($\omega_1 = 2\pi f_1$) at a start of the sweep (t=0) and $\omega_2$ is the instantaneous circular frequency at an end of the sweep (t=T). An example of plate motion that generates a flat far-field amplitude spectrum is shown in FIG. 3A. FIG. 3A illustrates a time signal 340 for plate motion of a marine vibrator source being swept from 3-100 Hertz. The vertical axis represents time in seconds and the horizontal axis represents distance in meters. As illustrated, the envelope (left and right outer bounds of the signal) decreases linearly. FIG. 3B illustrates an amplitude spectrum 342 for plate motion of the marine vibrator source being swept from 3-100 Hertz. The vertical axis represents amplitude and the horizontal axis represents frequency. As illustrated, the amplitude spectrum is proportional to $1/f^2$. The plate velocity can be described by:

$$v(t) = \sin\left(\theta(0) + \frac{\omega_1 \omega_2 T}{(\omega_1 - \omega_2)}\ln\left[1 + \frac{(\omega_1 - \omega_2)t}{\omega_2 T}\right]\right) \quad (8)$$

FIG. 3C illustrates a time signal 344 for plate velocity of a marine vibrator source being swept from 3-100 Hertz. The vertical axis represents time and the horizontal axis represents velocity. FIG. 3D illustrates an amplitude spectrum 346 for plate velocity of a marine vibrator source being swept from 3-100 Hertz. The vertical axis represents amplitude and the horizontal axis represents frequency. The plate acceleration can be described by:

$$a(t) = \cos\left(\theta(0) + \frac{\omega_1 \omega_2 T}{(\omega_1 - \omega_2)}\ln\left[1 + \frac{(\omega_1 - \omega_2)t}{\omega_2 T}\right]\right)\frac{\omega_1 \omega_2 T}{\omega_2 T - (\omega_2 - \omega_1)t} \quad (9)$$

FIG. 3E illustrates a time signal 348 for plate acceleration of the marine vibrator source being swept from 3-100 Hertz. The vertical axis represents time and the horizontal axis represents acceleration. FIG. 3F illustrates an amplitude spectrum 350 for plate acceleration of the marine vibrator source, which is oscillating, due to sharp start and end of the sweep, around a basically flat value between 3-100 Hertz. The "flat value" indicates that the mean amplitude over the periods of the signal between 3-100 Hertz is basically constant. The vertical axis represents amplitude and the horizontal axis represents frequency.

From equation 6, it can be determined that decreasing the sweep rate leads to an increase of the amplitude spectrum of a given sweep. A sweep rate decrease can correspond to an increase of sweep time (duration) for a given fixed frequency band. For instance, an overall amplitude spectra increase can be achieved by increasing the sweeping time for fixed time amplitudes and a fixed bandwidth. This can add relevant information to acquisition by keeping the time amplitudes of the signal low. FIG. 3G illustrates a time signal 352 for pressure generated at a 5 meter distance by the marine vibrator source being swept from 3-100 Hertz. The vertical axis represents time and the horizontal axis represents pressure multiplied by 30 pascals. FIG. 3H illustrates an oscillating flat amplitude spectrum 354 for pressure generated by the marine vibrator source being swept from 3-100 Hertz. The amplitude spectrum 354 is "flat" meaning that the mean amplitude between 3-100 Hertz is basically constant. The vertical axis represents amplitude and the horizontal axis represents frequency. The sound pressure level can be indicative of the pressure at a distance of five meters from the marine vibrator source and is equal to $$20\log\left(\frac{p}{p_0}\right),$$

where p is the root mean square sound pressure and $p_0$ is the reference sound pressure (1 micropascal). In this example, the sound pressure level has a peak value of 145 decibels. For an array including 32 marine vibrator source elements, the expected sound pressure level can have a peak value of 175 decibels.

FIGS. 4A-4C illustrate various signals and amplitude spectra for plate motion and pressure associated with a marine vibrator source. Specifically, FIG. 4A illustrates a time signal 440 for plate motion of a marine vibrator source being swept from 1-6 Hertz. The vertical axis represents time in seconds and the horizontal axis represents distance in meters. FIG. 4B illustrates a time signal 452 for pressure generated by the marine vibrator source being swept from 1-6 Hertz. The vertical axis represents time and the horizontal axis represents pressure in pascals. FIG. 4C illustrates an amplitude spectrum 454 for pressure generated by the marine vibrator source being swept from 1-6 Hertz. The vertical axis represents amplitude and the horizontal axis represents frequency. The sound pressure level can be indicative of the pressure at a distance of five meters from the marine vibrator source and is equal to $$20\log\left(\frac{p}{p_0}\right).$$

In this example, the sound pressure level has a peak value of 112 decibels, where the maximum value in the plot corresponds to approximately 0.4 Pascal.

Figure 5:
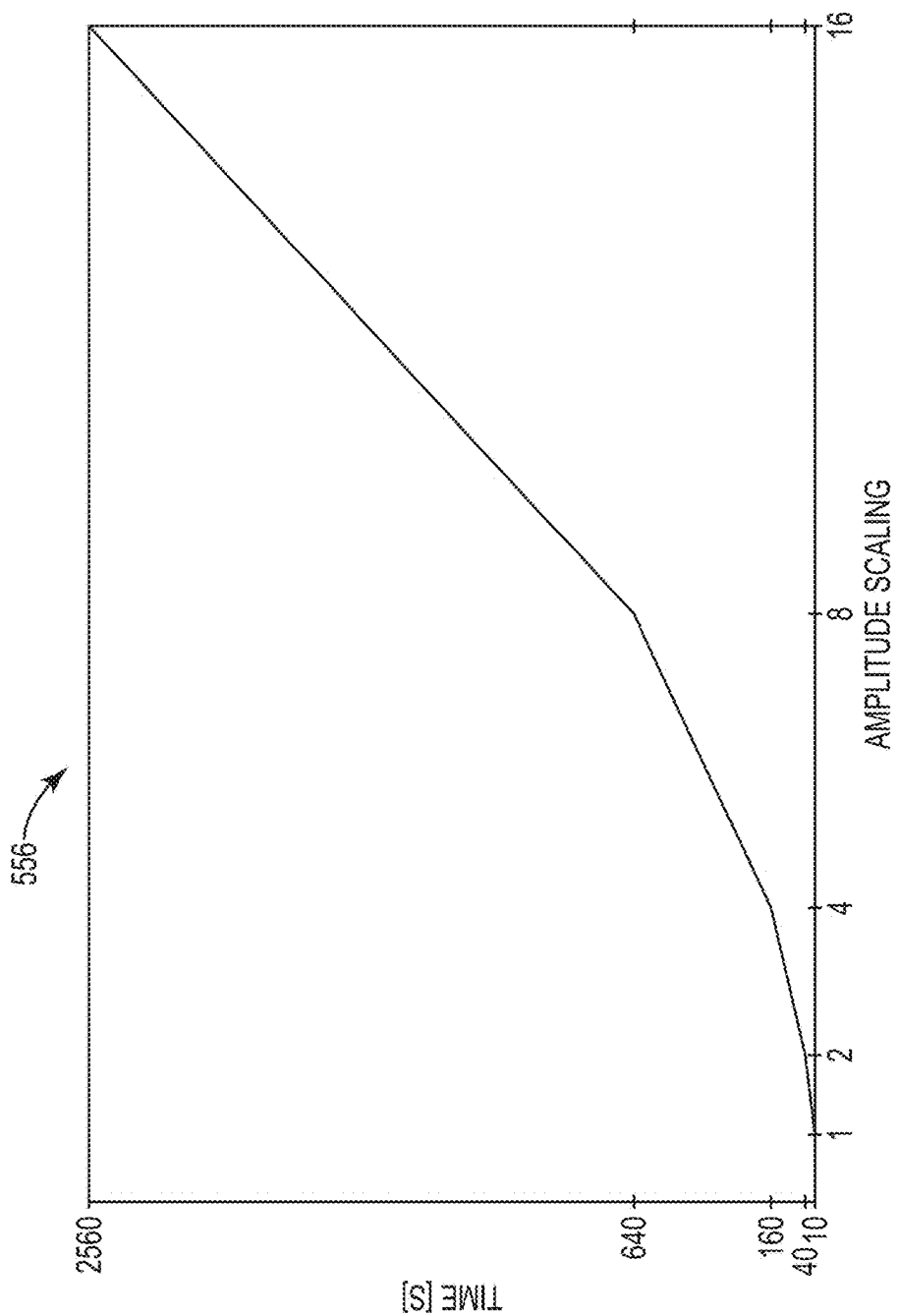
FIG. 5 illustrates a change in amplitude spectral scaling due to an increase in sweep duration for a fixed frequency range of a marine vibrator source.

FIG. 5 illustrates a change in amplitude spectral scaling 556 due to an increase in sweep duration for a fixed frequency range of a marine vibrator source. As illustrated, between 160 seconds and 640 seconds (a sweep time of 480 seconds), the amplitude scaling increases from 4 to 8 (a spectral amplitude increase of 4). Between 640 seconds and 2560 seconds (a sweep time of 1920 seconds), the amplitude scaling increases from 8 to 16 (a spectral amplitude increase of 8). This indicates that a factor of 4 in sweep time increase (1920 seconds/480 seconds=4) corresponds to a factor of 2 in spectral amplitude increase (8/4=2).

Figure 6:
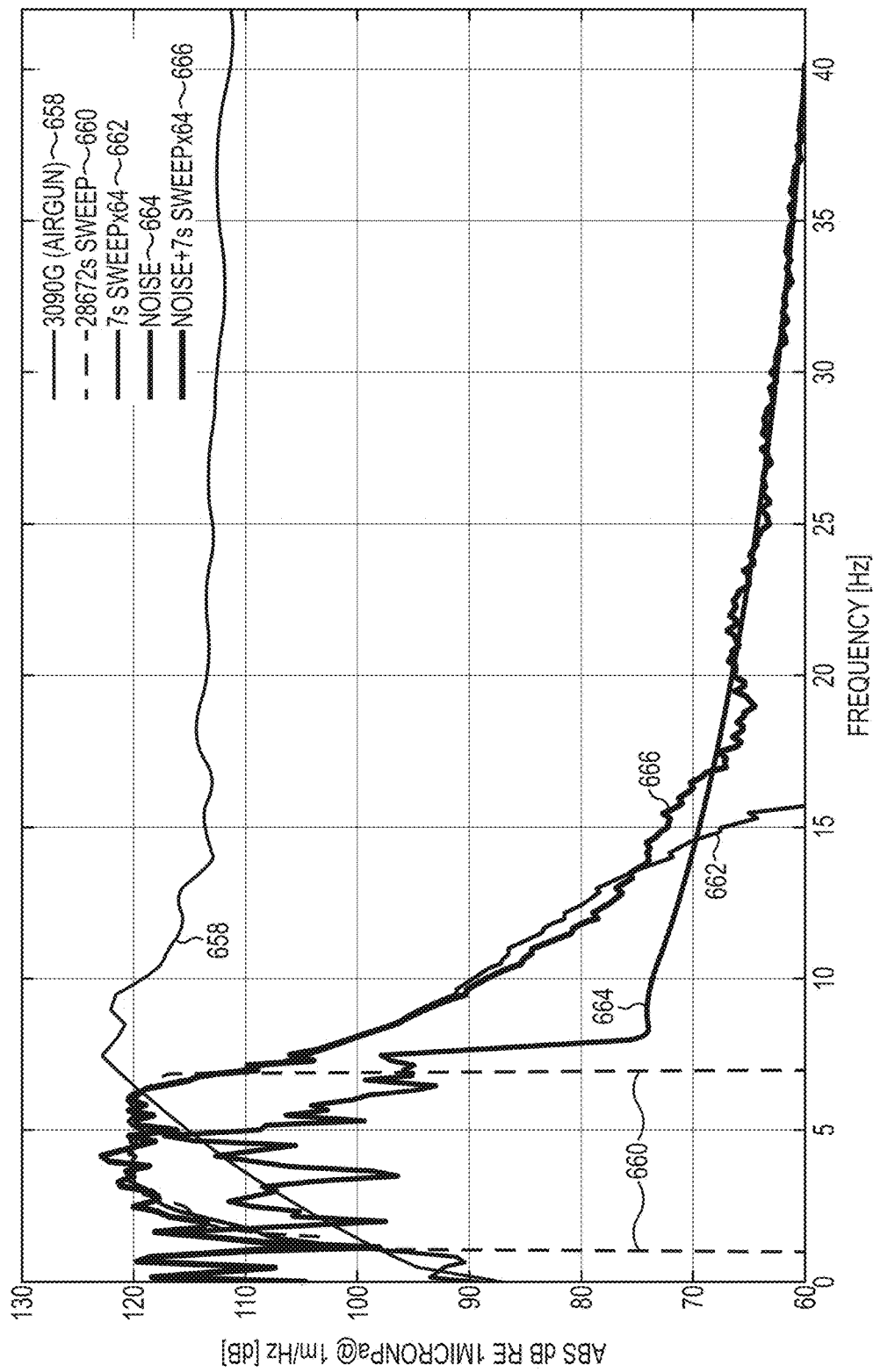
FIG. 6 illustrates a comparison of amplitude spectra of an impulsive seismic source and a marine vibrator source.

FIG. 6 illustrates a comparison of amplitude spectra of an impulsive seismic source and a marine vibrator source. Impulsive seismic sources, such as air gun sources, may not be capable of generating a low frequency spectral range (e.g., between 1 Hertz and 6 Hertz) with a required signal level above noise. However, the low frequency spectral range can be used to estimate elastic properties of the subsurface by FWI. In at least one embodiment of the present disclosure, low frequencies of 1 Hertz to 6 Hertz can be generated from low amplitude sweeps of a marine vibrator source by using the aforementioned properties.

For instance, FIG. 6 shows a comparison of an amplitude spectrum 658 for a typical air gun source and an amplitude spectrum 662 for a sweep of a marine vibrator source over a sweep length 660. For example, the sweep can be a linear sweep from 1 Hertz to 6 Hertz having a sweep length 660 of 8 hours. The sweep length 660 can be represented in multiples of 7 seconds (e.g., $7*4^6=28672$ seconds). This gives an equivalent of a 7 second sweep, which is amplitude scaled by a factor of 64 ($2^6$) as indicated by "7 s Sweep×64" for the amplitude spectrum 662. This means that the same output pressure level can be achieved by one marine vibrator source vibrating for 28,672 seconds or a group of 64 marine vibrator sources vibrating for 7 seconds. Different combinations of sweep length and groups of marine vibrator sources are possible. The amplitude spectrum of such a recorded sweep is for an example target depth of 5 kilometers and reflection coefficient of 0.1. The amplitude spectrum 662 for the marine vibrator source between 1 Hertz and 6 Hertz is clearly higher than the amplitude spectrum 658 of the air gun source in that frequency range. For the comparison illustrated in FIG. 6, the time amplitude peaks of the sweep of the marine vibrator source are approximately matching the level of the noise, which is about 1 bar. Likewise, the peaks in the amplitude spectrum 662 for the sweep of the marine vibrator source is approximately the same as the peaks in the amplitude spectrum 664 for the noise. The amplitude spectrum 666 illustrates a combination of the amplitude spectrum 662 for the sweep of the marine vibrator source and the amplitude spectrum 664 for the noise.

In at least one embodiment, FWI can be used for estimating detailed elastic properties of the subsurface. For example, to invert for the velocity model, an initial velocity model can be used and an updating process can be started. Such updating can back propagate the residual wavefield using reverse time migration and correlate with the forward propagated source wavefield. As used herein, a residual wavefield is the difference between a measured receiver wavefield and a modelled receiver wavefield using an initial velocity model. In order to relax the dependency of the inversion result on the initial velocity model, FWI can use the low frequencies with desired signal to noise ratio. The contribution of the low frequencies can help avoid correlations of undesired cycles of the receiver and source wavefields, which are known as cycle skipping effect in FWI.

Figure 7:
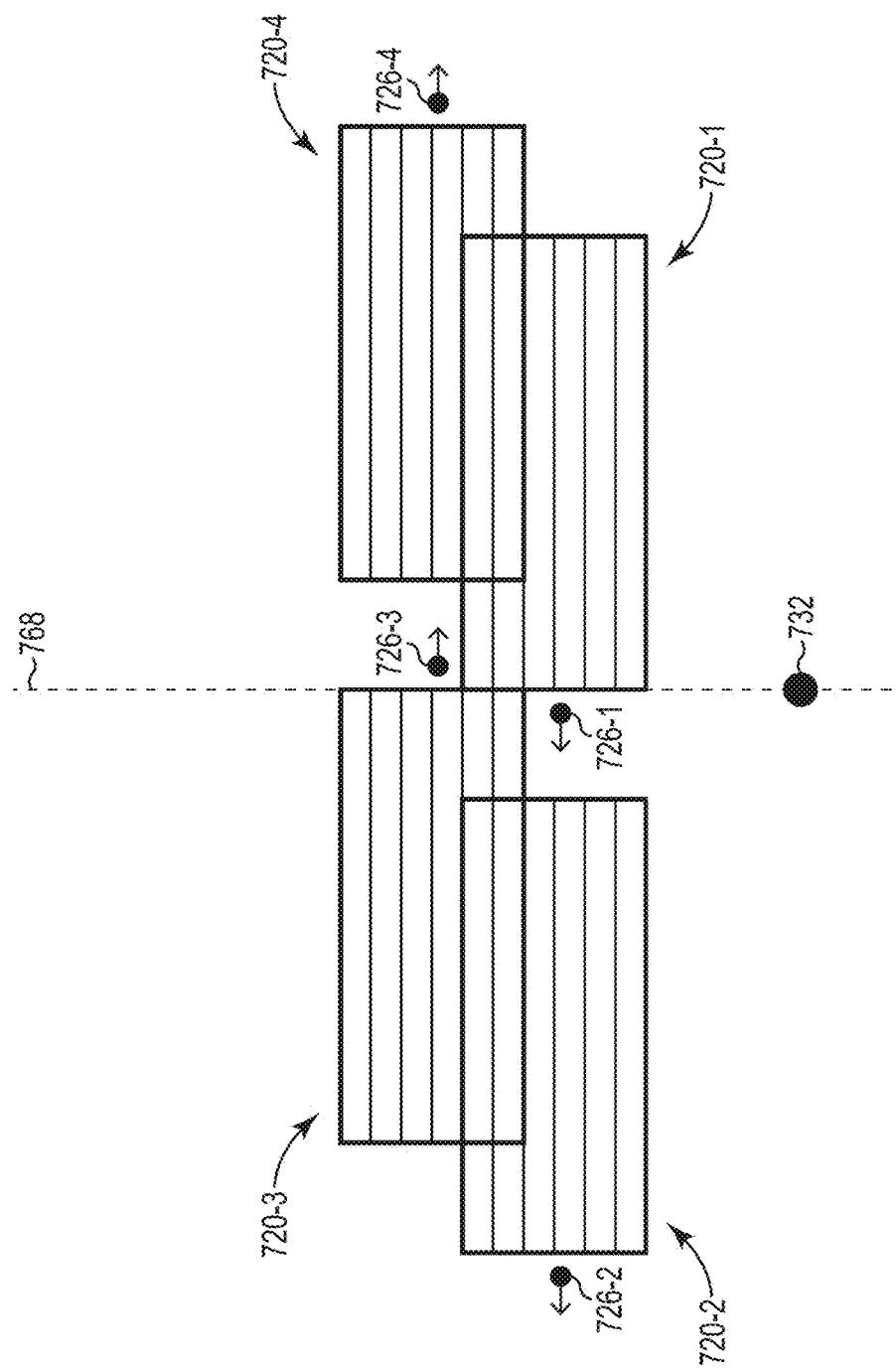
FIG. 7 illustrates a top view of marine surveying including at least a marine vibrator source.

FIG. 7 illustrates a top view of marine surveying including at least a marine vibrator source. The circle at the bottom of FIG. 7 indicates a fixed position of a marine vibrator source 732, such as a bender source, and the heavy lines above it indicate a streamer spread 720 (indicated in a first position by 720-1, in a second position by 720-2, in a third position by 720-3, and a fourth position by 720-4) of a three-dimensional (3D) towed streamer survey. The direction of movement along the first sail line for the streamer spread 720 is from right to left (from the first position as 720-1 to the second position as 720-2) as indicated by the arrows. The direction of movement along the second sail line for the second streamer spread 720 is from left to right (from the third position as 720-3 to the fourth position as 720-4) as indicated by the arrows. The streamer spread 720 can be towed by a respective marine survey vessel (not illustrated). Furthermore, in at least one embodiment, the marine survey vessel can also tow a marine survey source 726, illustrated in a first position as 726-1, in a second position as 726-2, in a third position as 726-3, and in a fourth position as 726-4. In at least one embodiment, the marine survey source 726 can be a marine vibrator source (e.g., swept from 6 to 100 Hertz). In at least one embodiment, the marine survey source 726 can be an impulsive seismic source (with negligible contribution to the frequencies from 1 to 6 Hertz).

At a start time, the streamer spread 720-1 has a first receiver aligned with the line 768 and the marine vibrator source 732. Subsequently, the streamer spread 720-3 has a first receiver aligned with the line 768 and the marine vibrator source 732. The time needed from the first to the last receiver along the respective streamer spread 720 to pass the vertical line 768 crossing the marine vibrator source 732 position may be one hour for an acquisition speed of approximately 2.5 meters per second and a 9 kilometer length of streamer spread, however, embodiments are not limited to this specific example as other speeds and lengths of streamer spreads can be used. This can be the time that limits a marine vibrator source sweep length, to make sure the receiver position, for instance at the vertical line 768, senses all the frequencies generated by the marine vibrator source 732 after applying movement correction. The data recorded from the marine vibrator source 732 from 1 to 6 Hertz can be used for FWI velocity model building and the data from the marine survey source 726 (e.g., the impulsive source and/or marine vibrator source from 6 to 100 Hertz) can be used for imaging.

In at least one embodiment, the spectral amplitudes for the emitted marine vibrator pressure wavefield can be reached by using three marine vibrator sources simultaneously. For ease of illustration, the three marine vibrator sources can include more and different marine vibrator sources, collectively indicated in the figure at 732. For all the receiver positions along the vertical line 768, after completing the survey, a wavefield representing one common source gather is present. In at least one embodiment, FWI updating can run reverse time migration by simultaneously running the receiver position backward in time, which can compensate for receiver movement.

In at least one embodiment, based on ambient noise, target depth, and a mechanical property of the marine vibrator source 726, a sweep length can be defined for given maximal and minimal frequencies, such that the sweep amplitude spectrum for the target reflection can be above the ambient noise and provide expected image resolution. As an example, it can be assumed that a 20 second sweep length fulfills the aforementioned considerations. For instance, one marine vibrator source can be busy for 20 seconds. To maintain a certain average source interval, for instance 25 meters with a nominal speed of 2.5 meters per second, at least three sources may be used to build a random sequence with some additional recording time. Mechanical properties of the marine vibrator source 726 can include physical dimensions and mass of the plates comprising the marine vibrator source, a distance by which the plates are able to move, a force capable of being applied by the plates, etc.

Figure 8B:
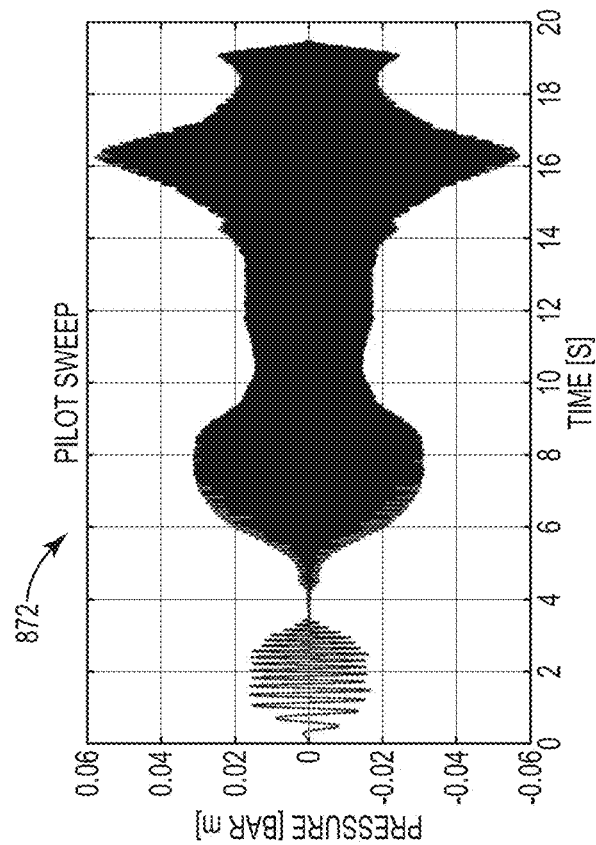
FIG. 8B illustrates a sweep signal for one of the marine vibrator sources.
Figure 8A:
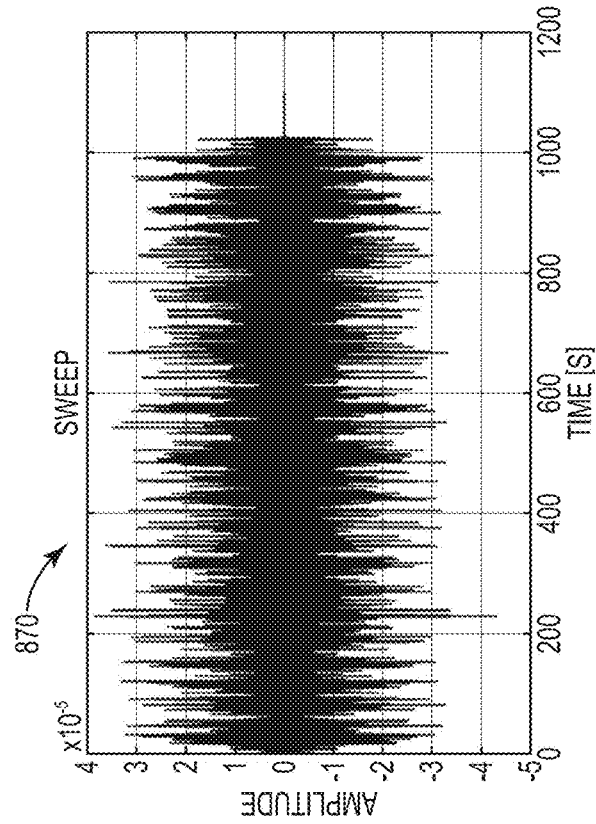
FIG. 8A illustrates a trace generated by a random sequence of sweeps of a plurality of marine vibrator sources.
Figure 9B:
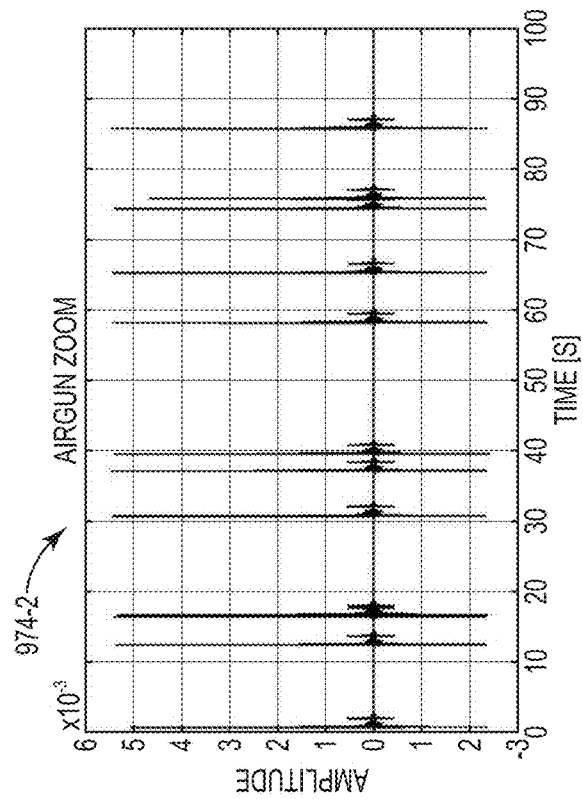
FIG. 9B illustrates a sequence of records for an output of an impulsive seismic source.

FIG. 8A illustrates a trace 870 generated by a random sequence of sweeps of a plurality of marine vibrator sources. FIG. 8B illustrates a sweep signal 872 for one of the marine vibrator sources. The random sequence of sweeps can be a random source sequence of 126 sweeps. In FIG. 8A, the values along the axes illustrate amplitude vs. time. The trace 870 represents one channel after motion correction. In FIG. 8B, the values along the axes illustrate pressure vs. time. The far-field sweep signal 872 can be a projected estimate of a marine vibrator source. After applying a correlation with the far-field sweep signal 872, a distinct sequence of records of two reflectors can be obtained, which can be compared to a similar sequence obtained by an impulsive seismic source, as illustrated in FIGS. 9A-9B.

Figure 9A:
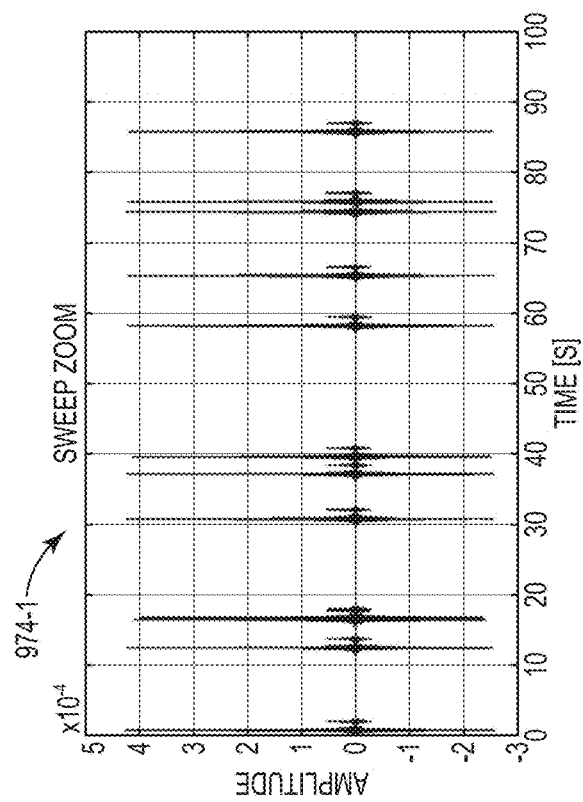
FIG. 9A illustrates a sequence of records for an output of a marine vibrator source.

FIG. 9A illustrates a sequence of records 974-1 for an output of a marine vibrator source. FIG. 9B illustrates a sequence of records 971-2 for an output of an impulsive seismic source. The sequences 974-1, 974-2 each include 100 records. The sequence of records 974-1 for the output of the marine vibrator source is illustrated after correlation. Likewise, the sequence of records 974-2 for the output of the impulsive seismic source is illustrated after correlation. In the example illustrated in FIGS. 9A-9B, differences between the two sequences of records 974-1, 974-2 may be due to different source signatures and a lower projected output level of a marine vibrator source. In at least one embodiment, the output level can be increased by forming marine vibrator source arrays or by further increasing the sweep length. Any further subsequent processing can follow the processing sequence from continuous or near-continuous recording of randomized simultaneous sources.

Figure 10:
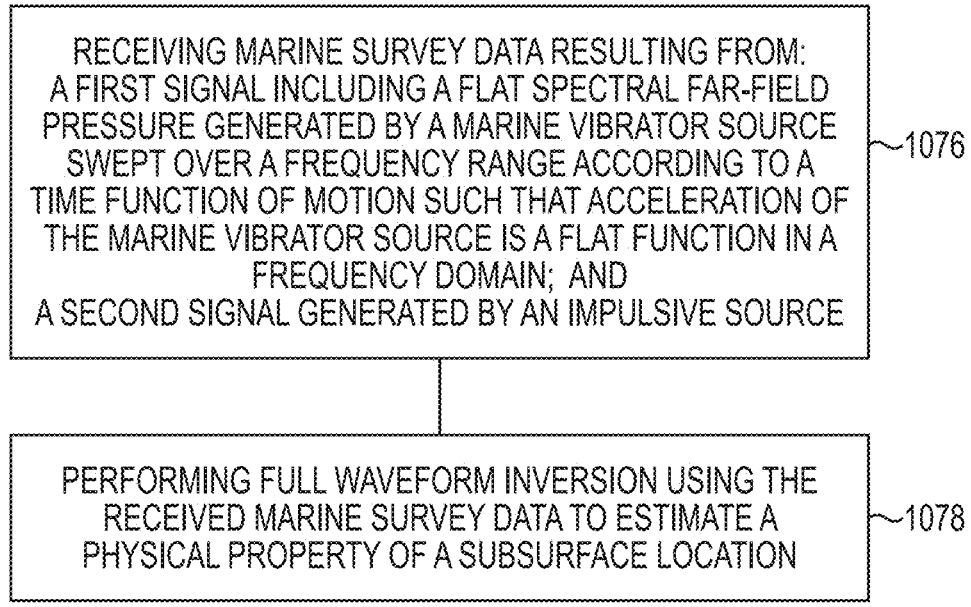
FIG. 10 illustrates a method flow diagram for marine vibrator source acceleration and pressure.

FIG. 10 illustrates a method flow diagram for marine vibrator source acceleration and pressure. At block 1076, the method can include receiving marine survey data resulting from: a first signal comprising a signal representing a flat spectral far-field pressure generated by a marine vibrator source swept over a frequency range according to a time function of motion such that acceleration of the marine vibrator source is a flat function in a frequency domain, and a second signal generated by an impulsive seismic source. At block 1078, the method can include performing full waveform inversion using the received marine survey data to estimate a physical property of a subsurface location, such as the presence of a reservoir that may contain hydrocarbons.

Receiving the marine survey data can include receiving data resulting from the flat spectral far-field pressure generated by the marine vibrator source being swept between 1 Hertz (Hz) and 6 Hz. For example, the first signal can be generated by the marine vibrator source being swept between 1 Hertz and 6 Hertz over at least one hour. Receiving the marine survey data can include receiving data resulting from the second signal that comprises frequencies greater than 6 Hz. In at least one embodiment, receiving marine survey data can include receiving marine survey data resulting from a third signal generated by a different impulsive seismic source (different than the impulsive seismic source that generated the second signal). For example with respect to FIG. 7, marine survey data can result from signals generated by a marine vibrator source 732, as well as a first (impulsive) marine survey source 726-1 and a second (impulsive) marine survey source 726-2.

In at least one embodiment, the method can include programming a controller of the marine vibrator source to control acceleration of plates of the marine vibrator source with the flat function in the frequency domain to generate the flat spectral far-field pressure. For example, the method can include programming the controller with a sweep signal for the marine vibrator source that is sinusoidal and that has frequencies that increase or decrease over the frequency range. The method can include programming the controller to receive an input (e.g., from a user) defining a desired sweep amplitude spectrum. The method can include programming the controller to adjust a sweep rate of the sinusoidal sweep signal to achieve the desired amplitude spectrum for the frequency range.

According to the method, receiving the marine survey data can comprise receiving the marine survey data from a third party, such as a party that performed the marine survey. In at least one embodiment, receiving the marine survey data can include receiving the marine survey data by performing the marine survey. In embodiments that include performing the marine survey, the method can include sweeping the marine vibrator source over the frequency range over a period of time sufficient for a plurality of towed streamers to cross a position of the marine vibrator source such that a plurality of receivers of at least one of the plurality of towed streamers collectively senses the first signal over the frequency range.

In accordance with a number of embodiments of the present disclosure, a geophysical data product may be produced. Geophysical data may be obtained and stored on a non-transitory, tangible machine-readable medium. Obtaining the geophysical data can include receiving marine survey data resulting from a first signal generated by a marine vibrator source swept through low frequencies and resulting from a second signal generated by an impulsive seismic source. The geophysical data product may be produced by processing the geophysical data offshore or onshore either within the United States or in another country. If the geophysical data product is produced offshore or in another country, it may be imported onshore to a facility in the United States. Processing the geophysical data can include performing a full waveform inversion to determine a physical property of a subsurface location. The geophysical data product can be recorded on a non-transitory machine-readable medium. In some instances, once onshore in the United States, geophysical analysis may be performed on the geophysical data product. In some instances, geophysical analysis may be performed on the geophysical data product offshore. For example, geophysical data can be obtained.

Figure 11:
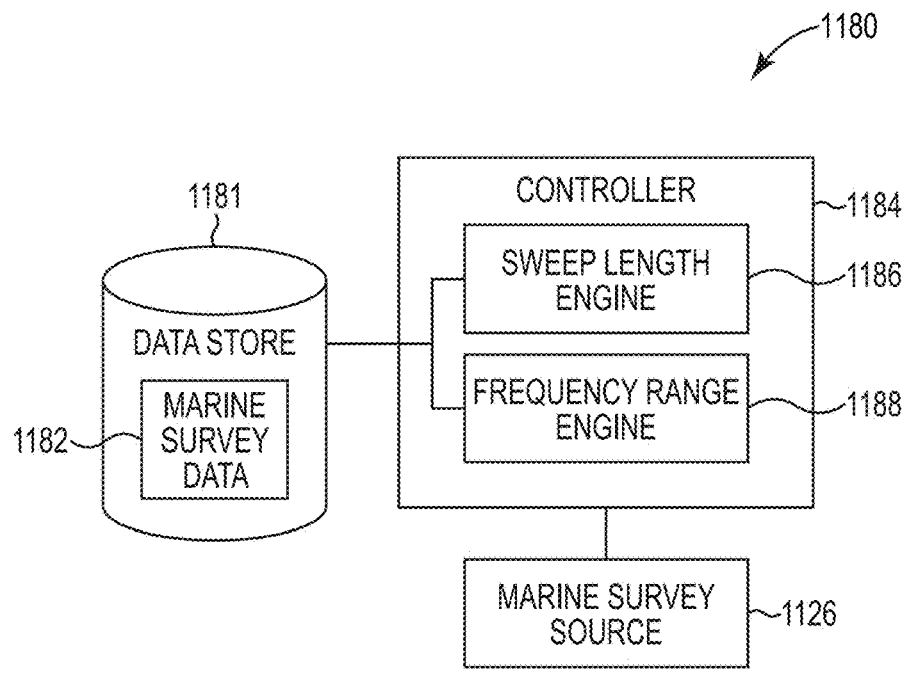
FIG. 11 illustrates a diagram of a system for marine vibrator source acceleration and pressure.

FIG. 11 illustrates a diagram of a system 1180 for marine vibrator source acceleration and pressure. The system 1180 can include a data store 1181, a marine survey source 1126 (e.g., a marine vibrator source), and a controller 1184. The controller 1184 can include a number of engines (e.g., sweep length engine 1186 and/or frequency range engine 1188) and can be in communication with the marine survey source 1126 via a communication link. In at least one embodiment, the controller 1184 can be in communication with the data store 1181 via a communication link. The data store 1181 can store marine survey data 1182 from a marine survey. The system 1180 can include additional or fewer engines than illustrated to perform the various functions described herein. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium or as a hard-wired program such as logic. Hard-wired program instructions can be considered as both program instructions and hardware.

The controller 1184 can be configured, for example, via a combination of hardware and program instructions in the sweep length engine 1186 and frequency range engine 1188, to define a sweep length of the marine survey source 1126 over a broadband frequency range based on ambient noise and target depth such that a sweep amplitude spectrum for a target refection is above the ambient noise. The broadband frequency range can include frequencies sufficient for full waveform inversion. In at least one embodiment, the controller 1184 can be configured to define the sweep length based on a mechanical property of the marine survey source 1126. The marine survey source 1126 can comprise a plurality of marine vibrator sources. The controller 1184 can be configured to define the sweep length for each of the plurality of marine vibrator sources and define randomized start times for each of the plurality of marine vibrator sources.

The recorded marine survey data 1182 can result from signals generated by the marine survey source 1126. The marine survey data 1182 can be processed to generate processed marine survey data (not specifically illustrated) without input from an impulsive seismic source. That is, in at least one embodiment, marine survey data 1182 can result from signals generated by a marine vibrator source over a broadband frequency range and be processed, for example, by performing full wave form inversion, without input from an impulsive seismic source. In at least one embodiment, the marine survey source 1126 can be maintained in a fixed position versus a plurality of towed streamers for recording signals generated by the marine survey source 1126.

Figure 12:
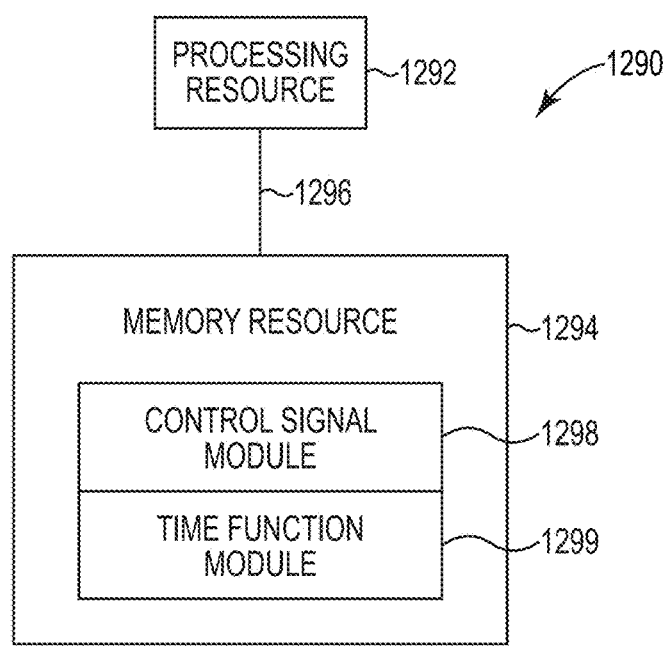
FIG. 12 illustrates a diagram of a machine for marine vibrator source acceleration and pressure.

FIG. 12 illustrates a diagram of a machine 1290 for marine vibrator source acceleration and pressure. The machine 1290 can utilize software, hardware, firmware, and/or logic to perform a number of functions. The machine 1290 can be a combination of hardware and program instructions configured to perform a number of functions (e.g., actions). The hardware, for example, can include a number of processing resources 1292 and a number of memory resources 1294, such as a machine-readable medium or other non-transitory memory resources 1294. The memory resources 1294 can be internal and/or external to the machine 1290, for example, the machine 1290 can include internal memory resources and have access to external memory resources. The program instructions, such as machine-readable instructions, can include instructions stored on the machine-readable medium to implement a particular function. The set of machine-readable instructions can be executable by one or more of the processing resources 1292. The memory resources 1294 can be coupled to the machine 1290 in a wired and/or wireless manner. For example, the memory resources 1294 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 1294 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources 1292 can be coupled to the memory resources 1294 via a communication path 1296. The communication path 1296 can be local or remote to the machine 1290. Examples of a local communication path 1296 can include an electronic bus internal to a machine, where the memory resources 1294 are in communication with the processing resources 1292 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 1296 can be such that the memory resources 1294 are remote from the processing resources 1292, such as in a network connection between the memory resources 1294 and the processing resources 1292. That is, the communication path 1296 can be a network connection. Examples of such a network connection can include a local area network, wide area network, personal area network, and the Internet, among others.

As shown in FIG. 12, the machine-readable instructions stored in the memory resources 1294 can be segmented into a number of modules 1298, 1299 that when executed by the processing resources 1292 can perform a number of functions. As used herein a module includes a set of instructions included to perform a particular task or action. The number of modules 1298, 1299 can be sub-modules of other modules. For example, the time function module 1299 can be a sub-module of the control signal module 1298 and/or the control signal module 1298 and the time function module 1299 can be contained within a single module. Furthermore, the number of modules 1298, 1299 can comprise individual modules separate and distinct from one another. Examples are not limited to the specific modules 1298, 1299 illustrated in FIG. 12.

The control signal module 1298 can include program instructions and/or a combination of hardware and program instructions that, when executed by a processing resource 1292, can apply a control signal defined by a time function of motion to control movement of a marine vibrator source. The control signal module 1298 can include program instructions and/or a combination of hardware and program instructions that, when executed by a processing resource 1292, can apply a sinusoidal sweep signal that increases or decreases monotonically over a frequency range as the control signal. The control signal module 1298 can include program instructions and/or a combination of hardware and program instructions that, when executed by a processing resource 1292, can receive an input defining a desired sweep amplitude spectrum and adjust a sweep rate of the sinusoidal sweep signal to achieve the desired amplitude spectrum for the frequency range. The control signal module 1298 can include program instructions and/or a combination of hardware and program instructions that, when executed by a processing resource 1292, can apply the control signal defined by the time function to control synchronously oscillating movement of plates of the marine vibrator source.

The time function module 1299 can include program instructions and/or a combination of hardware and program instructions that, when executed by a processing resource 1292, can define the time function of motion such that acceleration of the marine vibrator source is a flat function in a frequency domain to generate a flat spectral far-field pressure. The time function module 1299 can include program instructions and/or a combination of hardware and program instructions that, when executed by a processing resource 1292, can determine the time function based on a desired far-field pressure wavefield and a surface integral of a particle acceleration saltus across a surface of the marine vibrator source convolved with a free space Green's function.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
    a marine survey source comprising a marine vibrator source; and
    a controller, comprising hardware, coupled to the marine survey source, wherein the controller is configured to:
        define a sweep length of the marine survey source over a broadband frequency range based on ambient noise and a selected target depth such that a sweep amplitude spectrum for a target reflection is above the ambient noise;
        wherein the broadband frequency range includes frequencies sufficient for full waveform inversion.

2. The system of claim 1, wherein the marine survey source comprises a plurality of marine vibrator sources.

3. The system of claim 2, wherein the controller is configured to:
    define a respective sweep length for each of the plurality of marine vibrator sources; and
    define randomized start times for each of the plurality of marine vibrator sources.

4. The system of claim 1, wherein the system further comprises:
    recorded marine survey data resulting from signals generated by the marine survey source; and
    processed marine survey data based on the recorded marine survey data without input from an impulsive seismic source.

5. The system of claim 1, wherein the controller is further configured to define the sweep length based on a mechanical property of the marine survey source.

6. The system of claim 1, wherein the marine survey source is maintained in a fixed position versus a plurality of towed streamers for recording signals generated by the marine survey source.

7. The system of claim 1, wherein the controller is further configured to receive an input defining a desired sweep amplitude spectrum.

8. A method, comprising:
    defining, by a controller comprising hardware coupled to a marine survey source comprising a marine vibrator source, a sweep length of the marine survey source over a broadband frequency range based on ambient noise and a selected target depth such that a sweep amplitude spectrum for a target reflection is above the ambient noise;
    wherein the broadband frequency range includes frequencies sufficient for full waveform inversion.

9. The method of claim 8, further comprising:
    defining a sweep length for each of a plurality of marine vibrator sources including the marine survey source; and
    defining randomized start times for each of the plurality of marine vibrator sources.

10. The method of claim 8, further comprising defining the sweep length based on a mechanical property of the marine survey source.

11. The method of claim 8, further comprising maintaining the marine survey source in a fixed position versus a plurality of towed streamers for recording signals generated by the marine survey source.

12. The method of claim 8, further comprising receiving an input defining a desired sweep amplitude spectrum.

13. A non-transitory machine readable medium storing instructions executable by a processing resource to:
    define a sweep length of a marine survey source, comprising a marine vibrator source, over a broadband frequency range based on ambient noise and a selected target depth such that a sweep amplitude spectrum for a target reflection is above the ambient noise;
    wherein the broadband frequency range includes frequencies sufficient for full waveform inversion.

14. The medium of claim 13, further comprising instructions to:
    define a respective sweep length for each of a plurality of marine vibrator sources including the marine survey source; and
    define randomized start times for each of the plurality of marine vibrator sources.

15. The medium of claim 13, further comprising instructions to define the sweep length based on a mechanical property of the marine survey source.

16. The medium of claim 13, further comprising instructions to maintain the marine survey source in a fixed position versus a plurality of towed streamers for recording signals generated by the marine survey source.

17. The medium of claim 13, further comprising instructions to receive an input defining a desired sweep amplitude spectrum.

18. A method to manufacture a geophysical data product, the method comprising:
   defining, by a machine, a sweep length of a marine survey source, comprising a marine vibrator source, over a broadband frequency range based on ambient noise and a selected target depth such that a sweep amplitude spectrum for a target reflection is above the ambient noise;
   wherein the broadband frequency range includes frequencies sufficient for full waveform inversion;
   obtaining, by the machine, geophysical data, wherein obtaining the geophysical data comprises receiving marine survey data from operation of the marine survey source with the sweep length;
   processing, by the machine, the geophysical data to generate the geophysical data product; and
   recording the geophysical data product on a non-transitory machine-readable medium.

19. The method of claim 18, wherein processing the geophysical data comprises processing the geophysical data offshore or onshore.

* * * * *